Oct. 25, 1966 R. R. HAERING ETAL 3,281,714
INJECTION LASER USING MINORITY CARRIER INJECTION BY TUNNELING
Filed Dec. 31, 1963

INVENTORS.
RUDOLPH R. HAERING
PETER B. MILLER

BY Thomas & Crickenberger

ATTORNEYS

United States Patent Office 3,281,714
Patented Oct. 25, 1966

3,281,714
INJECTION LASER USING MINORITY CARRIER INJECTION BY TUNNELING
Rudolph R. Haering, Kitchener, Ontario, Canada, and Peter B. Miller, Peekskill, N.Y., assignors to International Business Machines Corporation, New York, N.Y., a corporation of New York
Filed Dec. 31, 1963, Ser. No. 334,722
1 Claim. (Cl. 331—94.5)

This invention relates to injection lasers, and more particularly to injection lasers using minority carrier injection by tunneling.

The term "laser" is derived from the initials of Light Amplification by Stimulated Emission of Radiation, and denotes a device for generating and amplifying light wave energy. A laser generates coherent ("in-phase") light as opposed to the incoherent light normally encountered in sunlight and everyday light sources. Because of the many applications available for coherent light, the laser has attracted great attention since its development several years ago.

Up to the present time lasers have been constructed with active materials including (1) gases, such as helium mixed with neon, (2) crystals, such as rods of ruby, glass or rare earth materials, (3) liquids, such as benzene or pyridine and (4) semiconductors, such as gallium arsenide. These active materials are "excited" atomically by applying power from an external source in a process known as "pumping." Pumping may be accomplished by using other light sources or by the application of electrical energy. Pumping produces photons of light which are allowed to multiply and accumulate in a resonant structure until a desired intensity of light is attained. The operation of lasers may be intermittent (pulsed) or continuous in output.

It is an object of the present invention to provide a light source using minority carrier injection by tunneling.

Another object of the invention is to provide an injection laser structure using minority carrier injection by tunneling.

The injection laser is a semiconductor device similar to a transistor. In accordance with the present invention the device is a three layered cell comprising an n-type layer, an insulating barrier layer and a p-type layer. In this connection the terms n-type and p-type are used to denote materials having an excess of free electrons and an excess of holes (deficiency of free electrons), respectively. Electrodes are attached to the n-type material and to the p-type layer. A potential difference is established across the electrodes, and when this potential difference equals the energy gap in the p-type material, minority carriers (electrons) are injected into the p-type material by tunneling through the junction formed by the barrier layer. The minority carriers injected into the p-type material subsequently recombine with the majority carriers (holes) releasing energy in the form of photons of light. The cell is formed with parallel, mirror-like ends and photons build up between the ends as in the resonant structures of conventional lasers. The coherent light thus generated is emitted from the junction region.

The foregoing and other objects, features and advantages of the invention will be apparent from the following more particular description of a preferred embodiment of the invention, as illustrated in the accompanying drawings in which.

Figure 1:
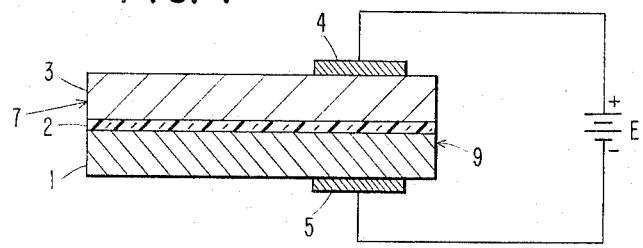
FIG. 1 is a schematic illustration of a cell constructed in accordance with the principles of the invention.

The light cell shown in FIG. 1 comprises three layers. The bottom layer 1 is pure aluminum, a conductor having an excess of free electrons which are easily displaced. This aluminum layer 1 is oxidized to form a very thin barrier layer 2 of aluminum oxide on the order of 100 A. or less in thickness. On top of the barrier layer is a transparent layer 3 of p-type phosphor, which is a luminescent material and has an excess of holes. Electrodes 4 and 5 are affixed to layers 3 and 1, respectively, and the electrodes are connected to a potential source E.

When the negative bias applied to the aluminum layer 1 is approximately equal to the energy gap of the p-type phosphor, excess electrons from the aluminum layer 1 will be injected into the phosphor layer 3 by tunneling through the barrier layer of insulation 2 forming the junction between the n-type and p-type layers. These electrons, or minority carriers as they are called, will subsequently recombine with the excess holes in the phosphor and release photons of light.

In a p-type material having unit quantum efficiency, one photon will be emitted for each injected minority carrier. The energy of these photons is normally somewhat less than that energy which corresponds to the absorption edge so that the photons are not strongly reabsorbed. The photon emission increases with the density of the tunneling current, and current densities of $10^2$ to $10^5$ amperes per square centimeter are possible. With such injection levels it is possible to achieve a population inversion between the conduction band and the activator centers whose energies are near the valence band. This produces stimulated emission and the cell will exhibit laser action. Laser action will take place at smaller current densities if a resonant structure is employed by providing the cell with parallel, mirror-like sides 7 and 9 which reflect the photons back and forth between them until their intensity has become too great to be reflected internally.

In the operation of the cell some current will exist because of majority carrier injection. This current does not produce light emission and is undesirable. The barrier layer 2 is of the utmost importance in providing a blocking action against large majority carrier currents, but thicker films lead to much lower light outputs. The barrier layer 2 may be constructed of silicon oxide or other suitable insulation, and other p-type luminescent materials such as cadmium telluride or zinc telluride may be utilized. It has also been found that gold is effective as a material for layer 1.

Figure 2A:
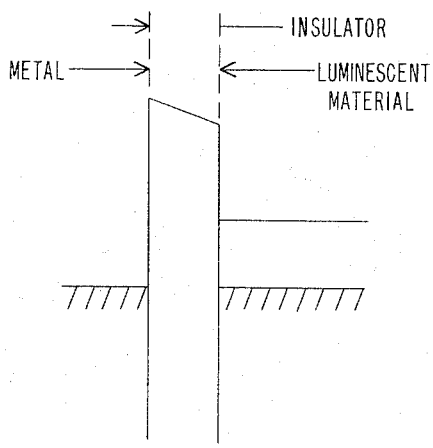
FIGS. 2a and 2b are diagrammatic illustrations of the band structure for conditions of zero bias and bias potential equal to the energy gap, respectively.
Figure 2B:
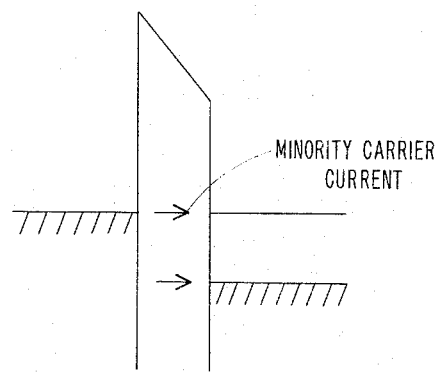

The band structures in FIGS. 2a and 2b illustrate diagrammatically the energy gap which must be overcome before minority carrier current will result. In FIG. 2a a zero bias condition is shown, while in FIG. 2b the bias is equal to the energy gap and minority carrier current exists.

Figure 3A:
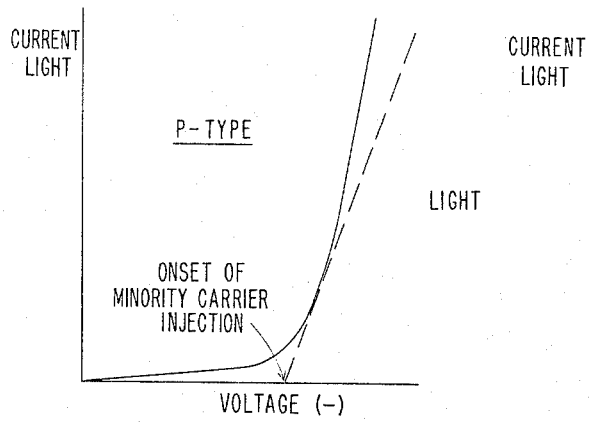
FIGS. 3a and 3b are current-voltage curves and light emission curves for p-type and n-type materials, respectively.
Figure 3B:
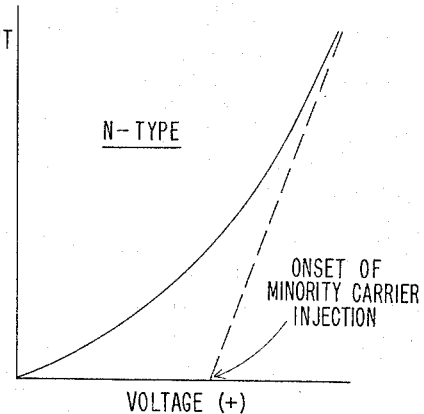

In FIGS. 3a and 3b current-voltage curves and light emission curves are shown for p-type and n-type materials, respectively. The layer 3 of FIG. 1 is preferably a p-type material, but by reversing the bias polarity an n-type material such as cadium sulfide or zinc sulfide may be used.

The light cell of the present invention operates at normal temperatures and does not require the extremely low temperatures of superconductive devices.

While the invention has been shown and described with particular reference to a preferred embodiment, it will be understood by those skilled in the art that various changes in form and details may be made without departing from the spirit and scope of the invention.

What is claimed is:

An injection laser comprising a layer of aluminum, a layer of p-type luminescent material, a barrier layer of aluminum oxide not exceeding 100 A. in thickness separating said aluminum and said luminescent material, said laser comprising a pair of mutually parallel mirror-like sides extending transversely to said layers for causing repeated resonant light reflection and a source of potential difference equal to the energy gap of said luminescent material connected across said aluminum and said luminescent material, whereby minority carriers from said aluminum are injected into said luminescent material by tunneling through said barrier layer to produce laser action.

References Cited by the Examiner

UNITED STATES PATENTS

| 3,056,073 | 9/1962 | Mead | 317—234 |
| 3,204,159 | 8/1965 | Bramley et al. | 317—238 |

OTHER REFERENCES

Anderson, "Radiation From GaAs Tunnel Diodes," Proceedings of the IEEE, vol. 51, No. 4, April 1963, page 610.

Hall et al., "Coherent Light Emission From GaAs Junctions," Physical Review Letters, vol. 9, No. 9, Nov. 1, 1962, pages 366–368.

Thomas et al., "Fluorescence in CdS and its Possible Use for an Optical Maser," Journal of Applied Physics, vol. 33, No. 11, November 1962, pp. 3243–3249.

Wang, "Proposal for a Two-Stage Semiconductor Laser Through Tunneling and Injection," Journal of Applied Physics, vol. 34, No. 12, December 1963, pages 3443–3450.

JEWELL H. PEDERSEN, *Primary Examiner.*

RONALD L. WIBERT, *Examiner.*